F. BONAVENTURE.
Clothes-Line Adjuster.

No. 226,384.  Patented April 13, 1880.

Witnesses
Henry C. Hudson
Wm H. Broadway

Inventor:
Francis Bonaventure
By Amos Broadway
Atty

UNITED STATES PATENT OFFICE.

FRANCIS BONAVENTURE, OF NEW YORK, N. Y.

CLOTHES-LINE ADJUSTER.

SPECIFICATION forming part of Letters Patent No. 226,384, dated April 13, 1880.

Application filed August 18, 1879.

*To all whom it may concern:*

Be it known that I, FRANCIS BONAVENTURE, a citizen of France, residing in the city, county, and State of New York, have invented an Improved Clothes-Line Adjuster, of which the following is a specification, reference being had to the accompanying drawings, making part of said specification, and to the figures and letters of reference marked thereon.

The object of my invention is to provide a simpler and more effectual adjuster for taking up the slack of clothes-lines.

My invention consists of a metal link having a hook and two eyes and combined with the clothes-line, the hook being arranged to catch upon knots made in the line at such intervals as may be necessary to draw it up to the proper tension.

Figure 1:
Figure 2:
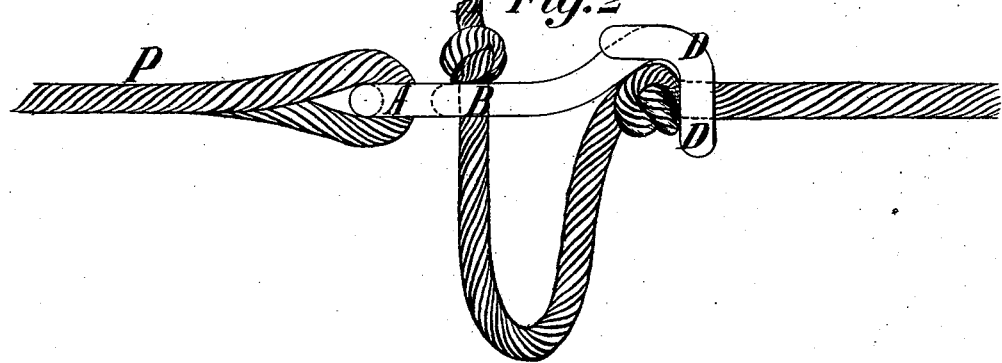
Figure 3:
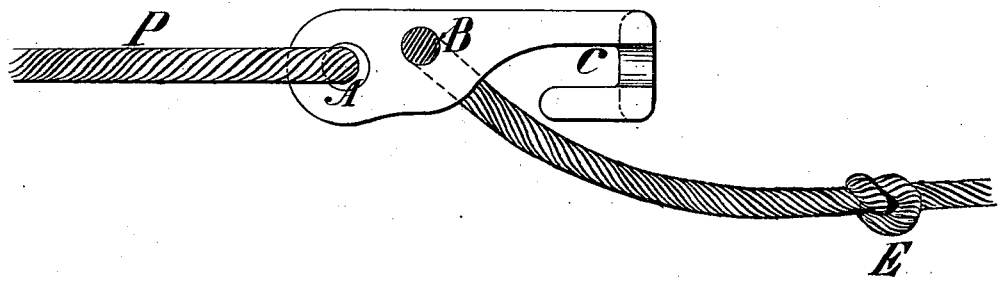

Reference being had to the drawings, Figure 1 shows the line hanging slack upon the pulleys. Fig. 2 shows the slack taken up by the link-adjuster, and also a side elevation of the link. Fig. 3 shows a top view of the link with the two ends of the line connected thereto, the line hanging slack.

An eye in one end of the link is shown by A, in which one end of the line P is attached. A second eye is shown in the link by B, in which the opposite end of the line is secured, the line hanging slack.

Now, to draw the line tight, a knot, E, is tied in the line and hooked in the hook C of the link, formed by a crotch made in the opposite end of the link, which for this purpose is bent over at right angles, or nearly so, with the axis of the line, as shown by D D, Fig. 2, the one end of the link being flattened to receive the two eyes A and B, and the opposite end being bent or curved, as shown in the two figures by D, to form the hook.

The position of the knot in the hook is shown by Fig. 2.

As the line stretches additional knots are of course to be tied in it to draw the line to the desired tension when hooked up, as shown by Fig. 2.

I claim as my invention—

In combination with a clothes-line, a link having two eyes to connect the two ends of the line, and provided with a hook to catch upon a knot or knots tied in the line to take up the slack.

F. BONAVENTURE.

Witnesses:
 HENRY C. HUDSON,
 AMOS BROADNAX.